United States Patent
Ben-Sasson

(10) Patent No.: US 6,513,686 B1
(45) Date of Patent: Feb. 4, 2003

(54) WATER-SUPPLY PACK ASSEMBLY

(76) Inventor: Amit Ben-Sasson, Moshav Yanuv 42825, Moshav (IL)

( * ) Notice: Subject to any disclaimer, the term of this patent is extended or adjusted under 35 U.S.C. 154(b) by 0 days.

(21) Appl. No.: 09/650,680

(22) Filed: Aug. 30, 2000

(51) Int. Cl.[7] .................................................. B60R 7/00
(52) U.S. Cl. ................. 224/275; 224/148.5; 224/148.7; 224/926; 215/388; 220/709
(58) Field of Search ........................... 244/148.2, 148.4, 244/148.5, 148.7, 275, 414, 427, 926; 215/388; 220/705, 709

(56) References Cited

U.S. PATENT DOCUMENTS

| | | | |
|---|---|---|---|
| 2,584,646 A | * | 2/1952 | Wagstaff ....................... 108/45 |
| 2,645,392 A | * | 7/1953 | Gottsegen et al. .......... 206/541 |
| 4,120,426 A | | 10/1978 | Grubbs |
| 4,607,755 A | | 8/1986 | Andreozzi |
| 4,757,928 A | * | 7/1988 | Browne ....................... 224/275 |
| 5,301,858 A | * | 4/1994 | Hollander ................. 224/148.2 |
| 5,427,290 A | | 6/1995 | Thatcher |
| 5,465,885 A | | 11/1995 | Wyatt |
| 5,678,741 A | | 10/1997 | Schieber |
| 5,755,368 A | * | 5/1998 | Bekkedahl ................... 222/175 |
| 6,019,245 A | * | 2/2000 | Foster et al. ................ 215/11.6 |
| 6,082,583 A | * | 7/2000 | Bussell et al. .............. 220/739 |
| 6,145,695 A | * | 11/2000 | Garrigues .................... 137/209 |
| 6,199,729 B1 | * | 3/2001 | Drzymkowski ............. 138/120 |

FOREIGN PATENT DOCUMENTS

| | | |
|---|---|---|
| EP | 0297826 A | 1/1989 |
| GB | 2 102 387 A | 2/1983 |
| JP | 11-164472 | 6/1999 |

* cited by examiner

Primary Examiner—Stephen K. Cronin
(74) Attorney, Agent, or Firm—Oliff & Berridge, PLC

(57) ABSTRACT

A water-supply pack assembly adapted to hitch onto the driver's seat in an automobile, thereby making it possible for the driver to drink water drawn from the supply without having to interrupt his driving activity The assembly includes a fixture attachable to the headrest of the driver's seat and a water-supply pack mountable on the fixture so that it is then behind the back of the seat. A flexible tube extending from the outlet of the supply and terminating in a valved mouthpiece functions as a straw to permit the driver with the mouthpiece in place to suck water from the supply as he drives the vehicle.

14 Claims, 4 Drawing Sheets

WATER-SUPPLY PACK ASSEMBLY

FIELD OF THE INVENTION

This invention relates generally to a water-supply pack which makes it possible for an individual while engaged in an activity requiring the use of his hands, to drink water from the supply without interrupting this activity, and in particular to a water supply pack assembly adapted to hitch onto the driver's seat in an automobile which permits the driver to drink water from the supply as he drives the vehicle, or to hitch onto the pilot's seat in the cockpit of an aircraft making it possible for the pilot to quench his thirst as he controls the plane.

STATUS OF PRIOR ART AND BACKGROUND OF THE INVENTION

Perhaps the oldest form of a portable water supply is the goat skin bag. When in ancient times it became necessary for an individual to travel long distances in a hot climate such as a desert, he would then take on his trip goat skin bags filled with water. In order to drink from a goat skin bag, the drinker must hold the bag with both hands and raise it to a level at which he can pour water from the bag into his mouth. Clearly this operation requires the drinker to interrupt whatever other activity in which he was then engaged.

The necessity in a tropical environment for an individual to drink water at frequent intervals is the same in our age as in ancient times, for in either case, a failure to do so may result in dehydration and its serious consequences. There are many situations where it is desirable not only that the individual be able to quench his thirst at frequent intervals, but also that he be free to do so without using his hands and without having to interrupt whatever activity in which he was then engaged.

Typical of these situations is that of a jogger who wishes to jog at a steady pace on a hot day along a course running several miles. To avoid dehydration, the jogger must drink water at frequent intervals. But if the jogger has to take a break each time he wishes to drink, this will break his stride and also cause him to lose time in completing his course.

Should the jogger carry with him a bottle of water, then in order to drink from the bottle he would have to uncap it and raise it to his lips. This procedure is not difficult to carry out when the jogger is at rest. But if the jogger does not wish to stop jogging in order to drink from a bottle, he must at least slow down to do so.

The prior art recognizes the problem faced by joggers, hikers and others engaged in a sports activity who wish to quench their thirst without interrupting this activity. To make it possible for a jogger, a hiker or other individuals engaged in a more or less strenuous activity to drink water without using their hands for this purpose and without interrupting this activity, it is known to provide this individual with a water-supply backpack having shoulder straps to support the pack on the back of the individual.

One such water-supply backpack is disclosed in the 1995 U.S. Pat. No. 5,427,290 to Thatcher, the backpack having a water-filled bladder. Coupled to the outlet of the bladder is an elongated flexible tube acting as a straw, the tube terminating in a valved mouthpiece. A hiker carrying this backpack on his shoulder and placing the mouthpiece in his mouth can suck water from the supply without interrupting his hike. The 1994 Wyatt U.S. Pat. No. 5,465,885 discloses a similar backpack in which the compartment for the water supply is thermally insulated to maintain the water in a cold state.

Also known in the prior art are water-supply pouches supportable on a waist belt whereby a runner who wears his pouch on his waist can while running suck water from this supply by means of a straw tube extending from the waist-borne pouch.

The prior art also recognizes the need to supply water or other liquids to the driver of an automobile But the means provided for this purpose do not allow the driver to drink as he drives.

Thus Japanese Patent 11164472 (1999) discloses a holder for drinking cups attached to the headrest of a driver's seat. For a driver to take a drink, he would have to remove a cup from the holder and fill it with water. The driver obviously cannot do so while his hands are on the steering wheel of the car.

In the Schieber, U.S. Pat. No. 5,678,741, a tray for receiving cups is supported by straps from the headrest of a driver's seat, the tray then being behind the seat. The driver cannot, as he drives, remove a cup from the tray and fill it with a liquid. British Patent 2102387 (1989) incorporates into the structure of a headrest of a driver's seat an insulated water supply. The output of this supply is gravity-fed to a cooler placed below the headrest. The driver, with this arrangement, cannot drink as he drives.

In those situations in which a driver of a vehicle, such as a truck driver is required to travel a long distance and given a limited time to reach his destination, the driver cannot afford to lose time as a result of breaks to drink water. Yet a driver who forgoes breaks to drink water may have an impaired ability to drive safely. A driver who is well watered is more alert than one who is not.

The current practice on the part of driver faced with a long trip is for the driver to take with him bottles of water. But each time the driver takes a drink he must uncap a bottle and raise it to his lips, a procedure he is ill advised to carry out while having one hand on the steering wheel. But, if the driver, in order to drink has to bring his car to a halt, he then loses time.

The difficulty in carrying bottles of water in an automobile is that it has no interior compartment in which to store these bottles. Hence, it becomes necessary to rest the water bottles on the floor of the vehicle. As a result, the bottles behave as loose cannon that can be troublesome to the driver.

The current practice of a driver who has available in his car a bottle of water and wishes to drink from the bottle as he drives, is for the driver to clamp the bottle between his knees so that he can uncap the bottle and then with one hand, raise the bottle to his lips while his other hand remains on the steering wheel. This is a dangerous practice, for the driver is not then fully attentive to his driving activity.

A similar problem is faced by the pilot in a private aircraft such as a single engine plane whose seat is in the cockpit of the plane. Though on a long flight it is necessary for the pilot to drink water, he cannot leave his seat to do so. But if the pilot has available a bottle of water, it then becomes difficult for him to manipulate the bottle in order to drink while at the same time, piloting the plane, an activity which requires his undivided attention.

A water-supply pack in accordance with the invention is installable on any seat, whether in a room or in a moving vehicle, in which the occupant of the seat is not free to leave the seat yet requires drinking water without which he will not function well.

SUMMARY OF THE INVENTION

In view of the foregoing, the main object of this invention is to provide a water-supply pack assembly adapted to hitch onto a seat in a room or in a vehicle, making it possible for the occupant of the seat to quench his thirst at any time without having to interrupt whatever activity in which he is then engaged. Thus when the seat is the driver's seat in a vehicle, the driver may then travel long distances without taking a break, yet avoid dehydration and its consequences. And when the seat is the pilot's seat in an aircraft cockpit, the pilot, in the course of a long flight, may drink was at frequent intervals while piloting the plane.

An assembly in accordance with the invention, while especially useful when hitched onto the driver's seat of a vehicle, can also be hitched onto the passenger's seat next to the driver's scat to supply the passenger with water. Indeed the assembly may be hitched onto any chair or seat whose occupant is in need of drinking water but is not free to leave the seat to obtain water. Thus the assembly may be hitched onto a hospital wheelchair occupied by a patient connected to an IV system and therefore not free to leave the chair. Also while the assembly is mainly intended to supply potable water, since the liquid supply is thermally insulated, it may be used as a supply for a hot liquid, such as coffee or tea.

More particularly, an object of this invention is to provide an assembly of the above type having a fixture attachable to the headrest of a seat and a water-supply pack mounted on the fixture so that it is then placed behind the back of the seat.

In one embodiment of the invention, the pack is detachable from the fixture so that when the water supply is depleted, the water-supply pack can be detached from the fixture and refilled elsewhere before being returned to the fixture. Had it been necessary to refill the water supply while it is attached to the headrest in the vehicle, it would then be difficult to avoid spillage of the water and the resultant soiling of the vehicle interior.

Another advantage of an arrangement in which the water supply pack is attachable to a headrest fixture, is that it may be attached not to the rear of the fixture but the front thereof and then also serve as a head cushion. This is applicable only to water-supply packs which have a collapsible bladder enclosed in a fabric pouch, which pack has cushion-like characteristics.

Yet another object of this invention is to provide an assembly of the above type which may be mass-produced at relatively low cost.

From the standpoint of safety, a salient feature of the invention is that it allows the driver to have both his hands on the steering wheel of the vehicle while he is drinking water to quench his thirst. This makes it possible for the driver to give his fill attention to the driving and thereby avoid an accident Briefly stated, these objects are accomplished by a water-supply pack assembly adapted to hitch onto a scat in a room or in a vehicle, thereby making it possible for the occupant of the seat to drink water drawn from the supply without having to interrupt whatever activity in which he was then engaged. The assembly includes a fixture attached to the back of the seat and a water-supply pack mountable on the fixture so that it is then behind the back. A flexible tube extending from the outlet of the supply and terminating in a valved mouthpiece functions as a straw to permit the occupant, with the mouthpiece in place, to suck water from the supply.

BRIEF DESCRIPTION OF THE DRAWINGS

For a better understanding of the invention as well as other objects and features thereof, reference is made to the annexed drawings wherein.

DETAILED DESCRIPTION OF THE INVENTION

FIRST EMBODIMENT

Figure 1A:
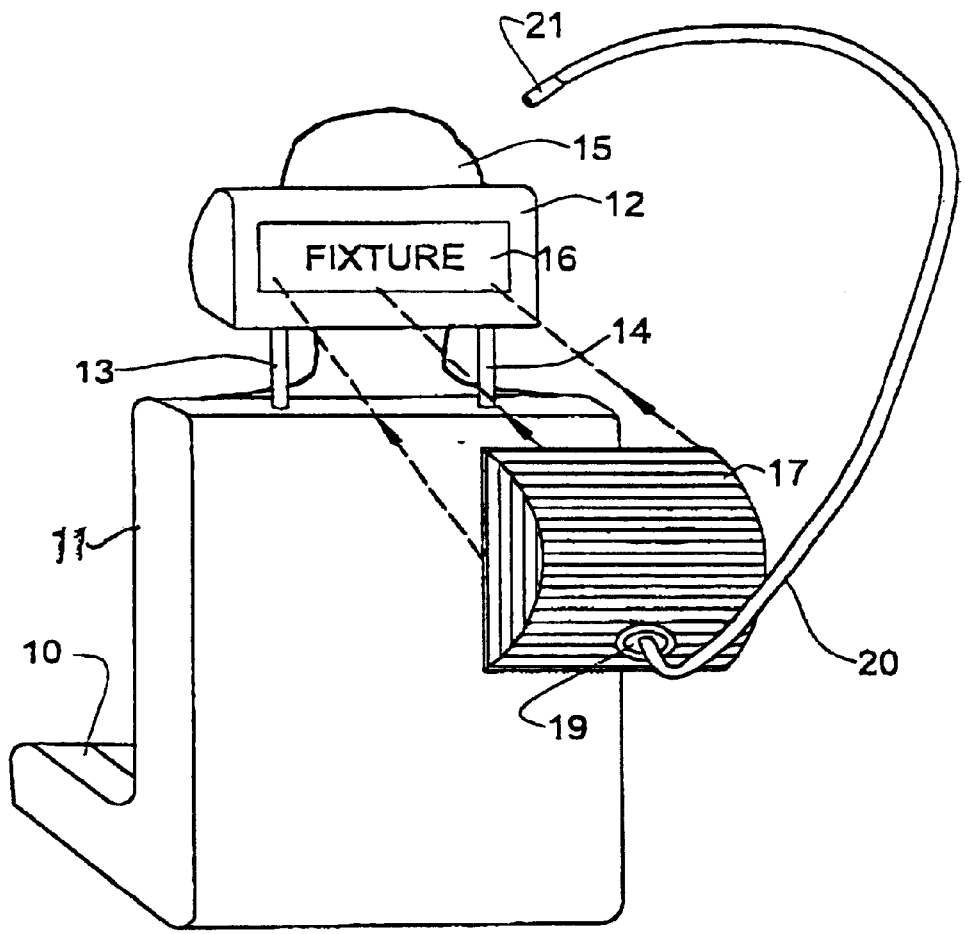
FIG. 1A is a perspective view of a water-supply pack assembly in accordance with the invention hitched onto the headrest of a driver's seat.
Figure 1B:
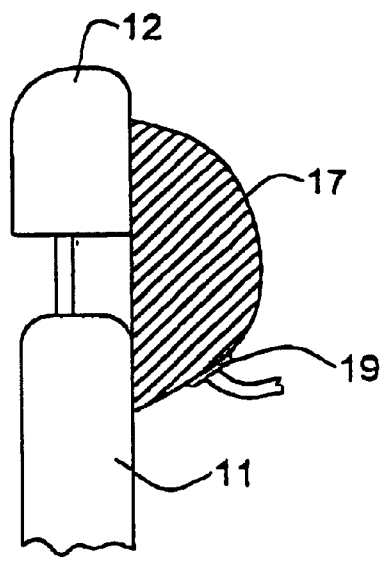
FIG. 1B is a side view of the assembly when hitched onto the headrest.

Referring now to FIG. 1A, shown therein is a conventional seat for the driver of an automobile or other vehicle onto which is hitchable a water-supply pack assembly in accordance with the invention. The driver's seat 10 is provided with a backrest 11 extending upwardly from the rear of the seat, and a headrest 12 mounted on vertical posts 13 and 14 anchored on the upper end of the backrest. The height of headrest 12 is adjustable to to accommodate the head of the driver 15 who occupies the seat.

The purpose of the assembly is to supply this driver with drinking water as he drives so that the driver can quench his thirst, whenever he wishes to do so, without interrupting his driving activity. The assembly facilitates a hands-free drinking operation during which the hands of the driver grasp the steering wheel of the vehicle.

The basic components of an assembly in accordance with the invention are a fixture 16, generally shown in block form in FIG. 1A, and a water-supply pack 17, mountable on the fixture. Fixture 16 is attachable to headrest 12 and when the pack is mounted on the fixture, it is then placed behind the back of the seat.

Figure 4:
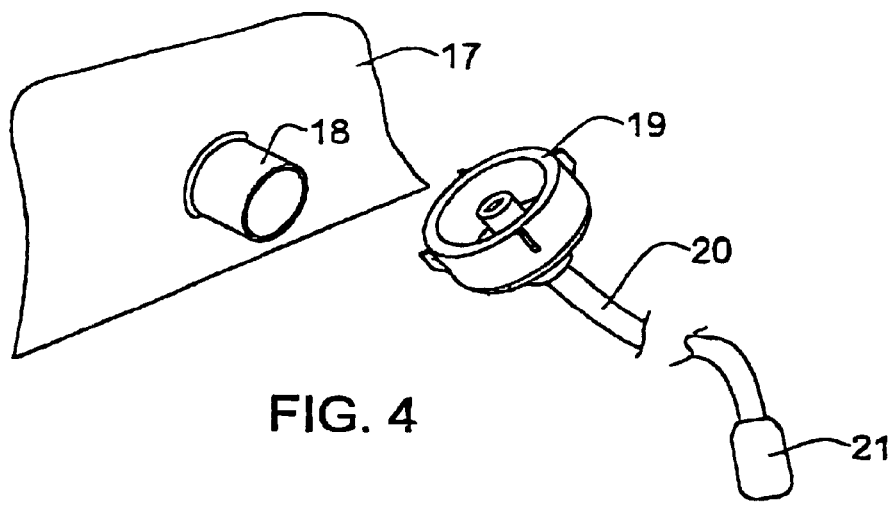
FIG. 4 illustrates the outlet of the water supply pack and the coupler therefor.

Water-supply pack 17 includes a casing or pouch in which is nested a bladder or other container for water, provided with an outlet 18. Outlet 18, as separately shown in FIG. 4, is engageable by a coupler 19 which screws onto the outlet 18 and is joined to the trailing end of an elongated, flexible plastic tube 20 whose leading end terminates in a valved mouthpiece 21. When mouthpiece 21 is placed in the mouth of the driver, tube 20 then functions as a straw to suck water from the supply. The valve incorporated in the mouthpiece is bite-activated, hence to open the valve the driver has only to bite on the mouthpiece. The mouthpiece valve is normally shut so that when the mouthpiece is not in use, there is no leakage of water from tube 20.

Figure 5:
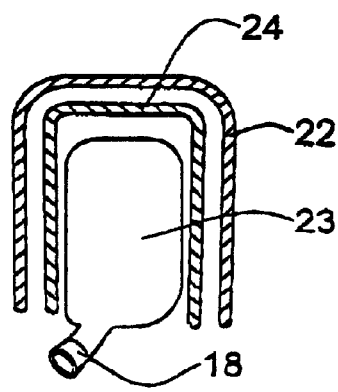
FIG. 5 schematically illustrates the interior of the water supply pack.

As shown schematically in FIG. 5, in one particular embodiment, the water-supply pack includes an outer pouch 22 formed of fabric material, within which is nested a collapsible bag 23 formed of synthetic plastic film material such as polyethylene or PVC. The outlet 18 of the pack is incorporated in the structure of bag 23. Interposed between pouch 22 and bag 23 is a layer 24 of thermal insulation material such as flexible foam plastic material or a felted fabric.

An assembly in accordance with the invention may include a water-supply pack of any known type having an outlet to which a straw tube can be coupled, provided that the pack include means for properly mounting it on a headrest fixture 16.

Figure 2:
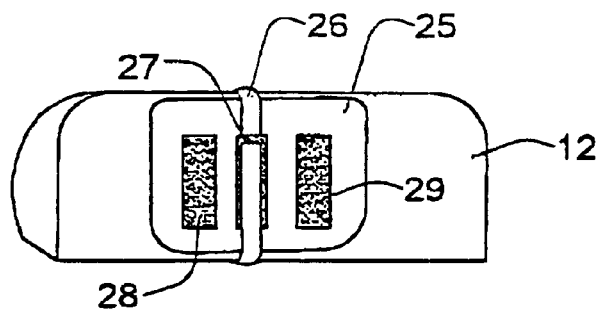
FIG. 2 illustrates one embodiment of the fixture included in the assembly.

FIG. 2 illustrates a another form of fixture for the assembly. The fixture includes a generally rectangular plaque 25 made of a sheet of flexible synthetic plastic material which is secured to the rear side of headrest 12 of the driver's seat by a strap 26. One end of strap 26 is joined to the upper end of a patch 27 on the plaque, the free end of the strap having adhered thereto one component of a Velcro fastener, the other component of which is secured to the lower end of patch 27.

A conventional Velcro fastener is formed by a female component and a male component. The female component is constituted of a dense array of miniature nylon loops and a male component by a dense array of miniature nylon hooks which interlock with the loops when the male component is pressed against the female component.

Figure 3:
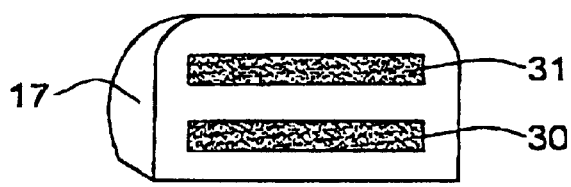
FIG. 3 is a rear view of the water supply pack which is mountable on the fixture shown in FIG. 2.

In the fixture shown in FIG. 3, secured to plaque 25 on either side of patch 27 are parallel vertical strips 28 and 29 which are female components of a Velcro fastener. Secured to the back side of the water-supply pack 17 are parallel horizontal strips 30 and 31 which are the male component of the Velcro fastener. Hence all that is necessary to install the assembly is to strap the fixture plaque 25 onto headrest 12 of the driver's seat, and to press the rear side of the water-supply pack onto the plaque to fasten the pack to the fixture. The actual size of the pack depends on its water capacity. Hence a pack having say a 3 liter water capacity will be larger than one having a 2 liter capacity.

Figure 6:
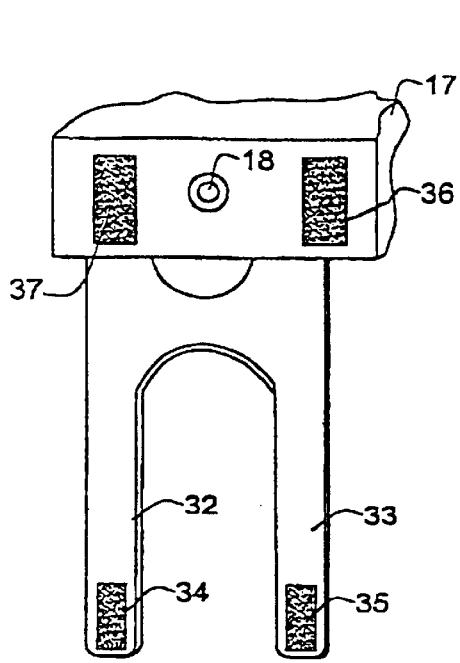
FIG. 6 shows a modification of the water-supply pack.

In order to ensure a secure mounting of the pack 17 on the headrest 12 of the driver's seat, attached to the pack is a pair of fabric suspenders 32 and 33 as shown in FIG. 6, at the free ends of which are secured Velcro fastener male components 34 and 35 When the suspenders are looped over the headrest, male components 34 and 35 are then joined to female component strips 36 and 37 secured to the bottom of the water-supply pack on either side of outlet 18.

SECOND EMBODIMENT

Figure 7:
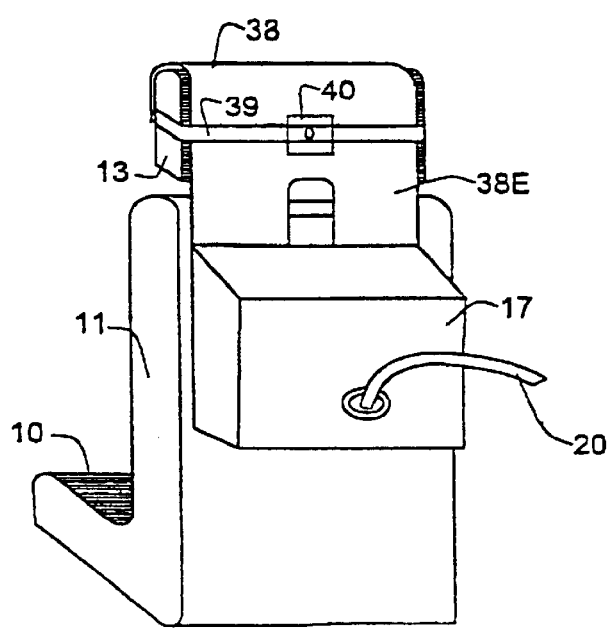
FIG. 7 illustrates a hood-type fixture for the assembly.

FIG. 7 illustrates an assembly in accordance with the invention in which the fixture attachable to the headrest 13 of the driver's seat takes the form of a fabric hood 38 that goes over the headrest 13 and is secured thereto by means of a strap 39 having a buckle 40. The water-supply pack 17, in this instance, is suspended from the hood by means of a hood extension 38E.

Figure 8:
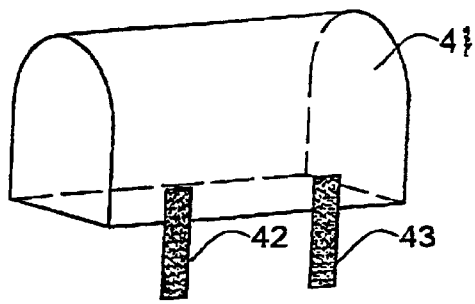
FIG. 8 shows a hat-type fixture for the assembly.

In the modified fixture shown in FIG. 8, instead of a hood which must be strapped on the headrest to hold it in place, the fixture takes the form of a fabric hat 41 whose dimensions are such that the hat fits neatly over the headrest. In this instance, the water-supply pack is suspended from hat 41 by straps 42 and 43.

THIRD EMBODIMENT

The embodiment of the assembly takes into account that the headset of a driver's seat in a vehicle is not standardized. Hence the length, width and height of the headrest in one model of an automobile may differ somewhat from headrest dimensions in another model.

In order for the fixture of the assembly to fit onto any existing headrest regardless of its size, the fife as shown in FIGS. 9 to 12 consists of a pocket 45 fabricated of a stretchable fabric, such as a fabric woven of neoprene fibers. The length and width of the pocket in its normal, unstretched state is somewhat smaller than the corresponding dimension of the smallest of existing headrests. Hence to receive this small headrest, the pocket must be stretched to accommodate it. It must be stretched to a greater degree to receive headrests having larger dimensions. But regardless of the degree to which the pocket is stretched, in all instances it clamps onto the headrest and can only be removed by pulling it off the headrest with sufficient strength to overcome the clamping action.

Joined to pocket 45 is a water supply pack 47 having an outlet 48 to which a flexible straw tube 49 is coupled in the same manner as in the other embodiments. The pack may be of the type disclosed in FIGS. 1 to 8, being composed of a collapsible plastic bag filled with water nested in a thermally-insulated fabric pouch. To make it possible to refill the plastic bag without having to do so through its outlet at the bottom of the bag, the bag is provided at its upper end with an inlet 50 having a removable cap.

However, the water supply pack may be designed to accommodate a non-collapsible plastic container or a standard 1.5 or 2 liter plastic water bottle (or any other suitable size and shape), it being only necessary to couple the neck of the bottle to outlet 48. When the bottle placed in the pouch is in an upright position so that the outlet is not at the bottom of the bottle, it is then necessary to place a siphon tube in the bottle.

Pocket 45 may be created by means of a rectangular sheet of stretchable fabric whose edge is sewed onto the upper end of the fabric's outer pouch of the water-supply pack 17 and whose side edges are sewed onto the sides of the pouch to define a pocket, one wall of which is formed by the pouch. The upper corners 45A and 45B of the pocket are cut to form arcuate openings for exposing the upper end of the headrest received in the pocket to see whether the headrest is fully inserted in the pocket.

Headrests come in various heights depending on the model of the car. It is not necessary that the pocket match the height of the headrest received in the pocket but only that the depth of the pocket receives a large portion of the headrest. The advantage of the pocket arrangement is that it fits all existing headrests on automobile seats and is easily installed, for no strap or other means is required to secure the pocket to the headrest.

In all embodiments of an assembly in accordance with the invention, a fixture is attached to the headrest of the seat and the water-supply pack is mounted on the fixture so that it then lies behind the back of the seat. The straw tube extending from the outlet of the supply pack is readily accessible to the seated driver or other occupant of the seat, and all he need do to take a drink is to put the mouthpiece in his mouth.

FOURTH EMBODIMENT

Figure 9:
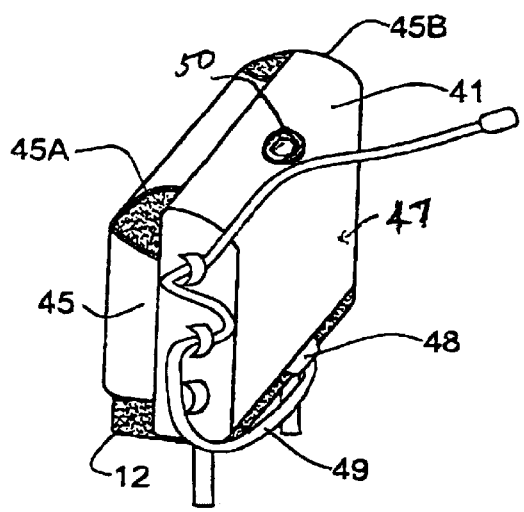
FIG. 9 is a prospective view of another embodiment of an assembly which includes a stretchable pocket to receive the headrest of the seat.
Figure 10:
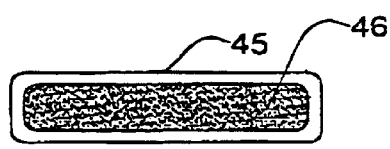
FIG. 10 is a bottom view of the pocket.
Figure 11:
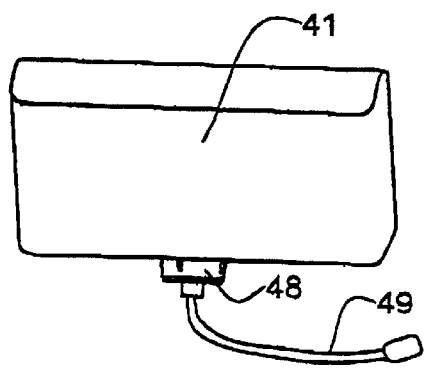
FIG. 11 is a front view of the assembly shown in FIG. 9.
Figure 12:
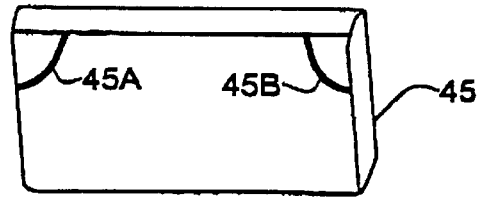
FIG. 12 is a rear view thereof.

In the embodiment of the assembly shown in FIGS. 9 to 11, a stretchable fabric pocket fitted onto the headrest is joined to a water-supply pack in which there is nested in a thermally insulated fabric pouch a collapsible plastic bag containing water. For this embodiment, when the water supply is depleted, one must refill the bag through the inlet 50. Though drinking water is universally available in household taps, (so-called tap water), for many drinkers, the preferred source of water is bottled mineral water that can be purchased in supermarkets, for such water is reputed to have greater purity than tap water. To take advantage of the availability of bottled water, in the embodiment of the assembly shown in FIG. 13, attached to a stretchable fabric product 51 fitted onto the headrest of a driver's seat in a vehicle is a cylindrical thermally-insulated fabric carrier 52 housing a standard one liter bottle of water.

The bottle is in an upright position behind the headrest, and its neck is threadably engaged by an outlet coupler 53 joined to a tubular straw 54 terminating in a valved mouthpiece 55. The length of the straw is sufficient to reach the mouth of the driver, as in FIG. 1A, so that the driver can draw water from the bottle as he drives.

But since the outlet of the bottled water supply is above the water level, outlet coupler 53 is provided with a siphon 56, which projects into the bottle to a point close to its bottom, thereby making it possible to suck the water out of the bottle.

Figure 13:
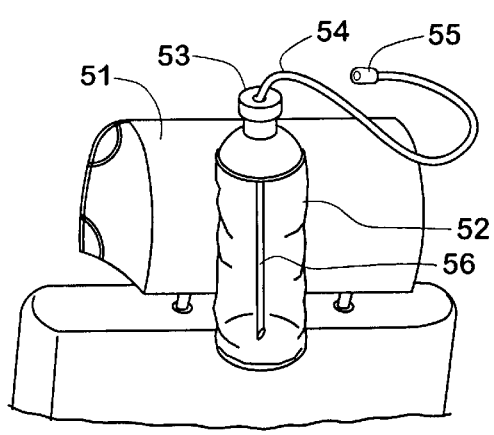
FIG. 13 is a perspective view of an assembly which includes a stretchable pocket, as in FIG. 9, to receive the headrest but in which the water-supply pack joined to the pocket is a bottle carrier.
Figure 14:
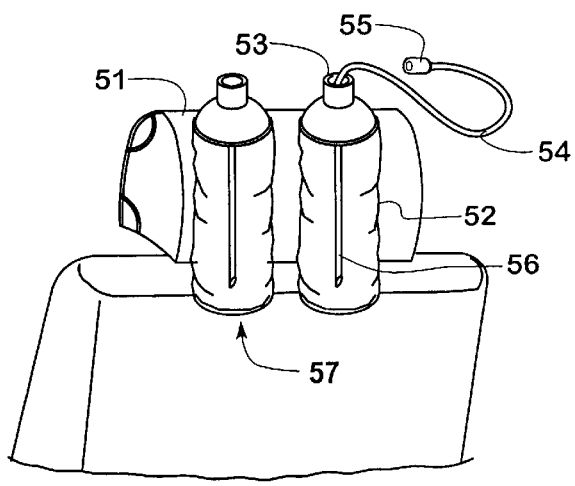
FIG. 14 shows an assembly similar to that in FIG. 13 except that a water pack is provided with a pair of bottles.

The assembly shown in FIG. 14 is the same as that illustrated in FIG. 13 except that also attached to the stretchable pocket 51 fitted onto the headrest of the vehicle is a reserve bottle carrier 57. Hence when the water in bottle carrier 52 is exhausted, one has only to switch coupler 53 onto the neck of the water-filled reserve bottle.

While there has been shown and described several embodiments of an assembly in accordance with the invention, it is to be understood that many changes may be made therein without departing from the spirit of the invention. Thus when the seat to which the water-supply pack is attached has no headrest, the pack can be attached to the back of the seat. And the water-supply pack instead of being suspended by straps from a hood fitted onto the headrest of the seat, can be suspended from the vertical posts on which the headrest is mounted, in which case the straps are provided with finger-actuated clamps which clip onto the posts, or other fasteners. Alternatively, the pack may be attached to the back of the seat by other fixture means, as described hereinbefore with reference to a headrest.

When one wishes simply to have a water supply in the vehicle without a straw to permit the driver to draw water from the supply, then the outlet 18 (FIG. 4) of the water-supply pack can be provided with a faucet or other valved spout.

What is claimed is:

1. A water-supply pack assembly adapted to supply water to a driver occupying a seat in an automobile having a back and a headrest, said headrest being engageable by the driver's head, such assembly comprising:
    A. a fixture attachable to the headrest, the fixture comprising a hood strapped onto the headrest,
    B. a water-supply pack suspended from the hood so that the water-supply pack is then behind the back of the seat, at a position close to the head of the driver, said pack including a water-fillable container having an outlet, and
    C. an elongated flexible tube coupled to said outlet and terminating in a mouthpiece, said tube extending between said outlet and said driver, whereby the driver with the mouthpiece in place, can then suck water from the container without interrupting his driving activity.

2. An assembly as set forth in claim 1, in which the mouthpiece is valved whereby to open the valve it is then necessary to bite the mouthpiece, the valve otherwise being shut to prevent outflow of water.

3. An assembly as set forth in claim 1, in which the fixture is constituted by a fabric hat which fits onto the headrest, the pack being suspended from the hat.

4. An assembly as set forth in claim 1, in which the container is a collapsible plastic bag.

5. An assembly as set forth in claim 1, in which the bag is nested in a fabric pouch.

6. An assembly as set forth in claim 5, in which a layer of thermal insulation is interposed between the bag and the pouch.

7. A water-supply pack assembly adapted to supply water to an individual such as a driver or pilot of a vehicle occupying a seat having a headrest, said assembly comprising:
    A. a fixture attachable to the headrest formed by a hood whose dimension in an unstretched state are somewhat smaller than those of the headrest whereby the hood must be stretched to receive and to clamp onto the headrest, and
    B. a water-supply pack including a water-fillable container secured to said hood so that the water-supply pack is disposed behind the headrest at a position close to the head of the driver.

8. An assembly as set forth in claim 7, in which the pocket is defined by a generally rectangular sheet of stretchable material whose upper end is sewn to the upper end of the rear of the pack, and whose sides are sewn to the sides of the rear of the pack.

9. An assembly as set forth in claim 8, further including an elongated flexible tube coupled to a water outlet in said pack and terminating in a mouthpiece which when placed in the mouth of the individual makes it possible for him to suck water from the pack.

10. An assembly as set forth in claim 8, in which the sheet is formed of stretchable fabric material and said pack is provided with an outer pouch to which said sheet is sewn, formed of non-stretchable fabric material.

11. An assembly as set forth in claim 10, in which said pouch is provided with side loops to store said tube.

12. A water-supply pack assembly adapted to supply drinking water to a driver occupying a seat in an automobile having a back so that he can drink without leaving his seat, said assembly comprising:
    A. a fixture attachable to the back of the seat, the fixture comprising a hood, and
    B. a water-supply pack secured to said hood so that the water-supply pack is disposed behind the back, said pack being provided with a tubular straw which terminates in the mouthpiece and extends from the pack to the mouth of the driver, whereby the driver, while seated with the mouthpiece in place can draw water from the pack.

13. A water-supply pack assembly as set forth in claim 12, in which the pack is constituted by a main carrier in which is nested a standard bottle of water having a neck, further including a coupler engaging said neck to which said straw is connected, said coupler being provided with a siphon that projects into the bottle.

14. The assembly as set forth in claim 13, further including a reserve carrier secured to said fixture whereby when said main carrier is exhausted, the coupler can then be switched to the reserve carrier.

* * * * *